(12) United States Patent
Yoshino et al.

(10) Patent No.: US 7,788,062 B2
(45) Date of Patent: Aug. 31, 2010

(54) THREE-DIMENSIONAL POSITION-MEASURING APPARATUS

(75) Inventors: Kenichiro Yoshino, Tokyo (JP); Kaoru Kumagai, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 121 days.

(21) Appl. No.: 12/056,987

(22) Filed: Mar. 27, 2008

(65) Prior Publication Data

US 2008/0243429 A1 Oct. 2, 2008

(30) Foreign Application Priority Data

Mar. 29, 2007 (JP) .............................. 2007-088195

(51) Int. Cl.
*G01C 17/00* (2006.01)
(52) U.S. Cl. ..................................................... 702/152
(58) Field of Classification Search .................. 702/152
See application file for complete search history.

(56) References Cited

U.S. PATENT DOCUMENTS

| | | | |
|---|---|---|---|
| 5,988,862 A | 11/1999 | Kacyra et al. | |
| 6,330,523 B1 | 12/2001 | Kacyra et al. | |
| 6,373,240 B1* | 4/2002 | Govari | 324/207.17 |
| 7,030,968 B2* | 4/2006 | D'Aligny et al. | 356/5.01 |
| 7,443,555 B2* | 10/2008 | Blug et al. | 359/196.1 |
| 2005/0172503 A1 | 8/2005 | Kumagai et al. | |

FOREIGN PATENT DOCUMENTS

| | | |
|---|---|---|
| CN | 1678883 A | 10/2005 |
| DE | 4031466 C1 | 11/1991 |

OTHER PUBLICATIONS

Office Action from counterpart Chinese Application No. 200810090704.7, dated May 10, 2010, 5 pages (with translation).

* cited by examiner

*Primary Examiner*—Aditya Bhat
(74) *Attorney, Agent, or Firm*—Brinks Hofer Gilson & Lione

(57) ABSTRACT

A three-dimensional position-measuring apparatus comprises a body, a rotational optical portion rotatable with respect to the body in a horizontal direction and comprising a reflective plate in which deflection in a vertical direction is controllable, a first data transmitting and receiving portion arranged in the body and comprising a first coil which has a rotational axis of the rotational optical portion as an axis, and a second data transmitting and receiving portion arranged in the rotational optical portion and comprising a second coil that has the same axis as that of the first coil and magnetically couples with the first coil.

5 Claims, 4 Drawing Sheets

THREE-DIMENSIONAL POSITION-MEASURING APPARATUS

This application claims priority under 35 U.S.C. §119 to Japanese Patent Application No. JP2007-088195 filed Mar. 29, 2007, the entire content of which is hereby incorporated by reference.

BACKGROUND OF THE INVENTION

1. Technical Field

The present invention relates to a structure for transmitting data at a rotor of a three-dimensional position-measuring apparatus.

2. Background Art

A three-dimensional position-measuring apparatus using a laser beam is known (for example, see Japanese Unexamined Patent Application Publication (translation of PCT Application) No. 2000-509150). The three-dimensional position-measuring apparatus scans and measures a position in a three-dimensional space using a distance-measuring device using a laser beam. Since the laser beam should be used to scan in three dimensions and should be irradiated on the surroundings, a three-dimensional position-measuring apparatus comprises a measuring portion which is rotatable with respect to a body and functions as an irradiating portion and a light receiving portion for the laser beam, as disclosed in Japanese Unexamined Patent Application (translation of PCT Application) No. 2000-509150.

Thus, the measuring portion is required to rotate with respect to the body and requires electrical power, which is supplied from the body, and various signals are transmitted between the measuring portion and the body. Therefore, the body and the measuring portion are disposed with electrodes at a concentric circumferential position with respect to the rotational axis, whereby electrical contact is ensured between the electrodes corresponding to each other when the measuring portion rotates with respect to the body.

However, since electrical contact between the body and the measuring portion that rotate with respect to each other is ensured by the above-described mechanical contact, the contact may become worn, and the durability thereof is low. In particular, this disadvantage becomes apparent when the rotational rate of the measuring portion is high. Moreover, this disadvantage may cause an increase in production costs and maintenance costs of the apparatus.

BRIEF SUMMARY

An object of the present invention is to provide a three-dimensional position-measuring apparatus in which a measuring portion rotates and a signal can be transmitted between the measuring portion and a body without contact.

According to a first aspect of the invention, the present invention provides a three-dimensional position-measuring apparatus comprising a body, a rotational optical portion rotatable with respect to the body and controlling deflection in a vertical direction, a first data transmitting and receiving portion arranged in the body and comprising a first coil which has the rotational axis of the rotational optical portion as an axis, and a second data transmitting and receiving portion arranged in the rotational optical portion and comprising a second coil that has the same axis as that of the first coil and magnetically couples with the first coil.

In the invention according to claim 1, data can be transmitted between the body and the rotating rotational optical portion without contact. That is, because the first coil and the second coil are coaxially arranged, when a high-frequency signal is sent to the first coil, the high-frequency signal is induced in the second coil by mutual induction. In this case, when a high-frequency signal is sent to the second coil, the high-frequency signal is induced in the first coil due to mutual induction. By utilizing this function, data can be transmitted between the first coil and the second coil, which do not contact each other. Therefore, electrodes are not required to come into contact with each other. It should be noted that when two coils are coaxially arranged, two coils have the same axis.

In the invention recited in claim 2 according to claim 1, the three-dimensional position-measuring apparatus further comprises a first circular portion made of a ring-shaped magnetic material and having a cross section in which a part is open so as to contain a member, and comprises a second circular portion made of a ring-shaped magnetic material and having a cross section in which a part is open so as to contain a member. The first coil is inserted into the inside of the first circular portion, and the second coil is inserted into the inside of the second circular portion. The first circular portion and the second circular portion are coaxially arranged such that each open portion of the holding shape thereof faces another.

According to the invention recited in claim 2, while mutual induction occurs between the first coil and the second coil, a closed magnetic path is formed between the first circular portion and the second circular portion, whereby both coils are magnetically coupled with high efficiency. Therefore, data can be transmitted at low transmission loss, and electric power consumption can be minimized. In the invention according to claim 2, the holding shape in cross section in which a part of the holding shape is open is a shape such as a concave shape, a horseshoe shape, an L shape, a boomerang shape, and a V shape, which has an open portion in a certain direction and can include the coil.

In the invention recited in claim 3 according to claim 1, the three-dimensional position-measuring apparatus further comprises an electric power supply portion arranged in the body and comprising a third coil which has the rotational axis of the rotational optical portion as an axis, and an electric power receiving portion arranged in the rotational optical portion and comprising a fourth coil which has the same axis as that of the third coil and magnetically couples with the third coil.

According to the invention recited in claim 3, electric power required at the rotational optical portion can be transmitted from the third coil to the fourth coil. The electric power transmission is also performed by utilizing the function of mutual induction, which is used for data transmission between the first coil and the second coil. By utilizing the mutual induction occurring between the coils, the electric power can be transmitted in a condition in which the coils are not in contact with each other.

In the invention recited in claim 4 according to claim 1, plural data signals, each having a frequency that is different from that of the others, are transmitted between the first data transmitting and receiving portion and the second data transmitting and receiving portion.

According to the invention recited in claim 4, while the number of coils is not increased, plural data signals can be simultaneously transmitted. Therefore, plural signals can be transmitted from the body to the rotational optical portion as signals for controlling the movement of the rotational optical portion, whereby more complex control can be performed. Moreover, while the number of coils is not increased, plural data signals can be transmitted from the body to the rotational optical portion.

That is, the data signals are transmitted between the first coil and the second coil by utilizing the mutual induction occurring between the coils, whereby plural signals, in which each of them has a different frequency, can be used. The signals in which each of them has a different frequency can be individually separated by using a quartz filter, a ceramic filter, or the like, which has a steep band-pass characteristic. Therefore, the data signals transmitted between the first coil and the second coil can be multiplexed, and two-way communication is allowed.

In the invention recited in claim 5 according to claim 1, the rotational optical portion comprises a measuring device for measuring an angle of vertical deflection of the reflective plate that is provided thereto. Data for controlling the angle of vertical deflection is transmitted from the first data transmitting and receiving portion to the second data transmitting and receiving portion, and output of the measuring device is transmitted from the second data transmitting and receiving portion to the first data transmitting and receiving portion.

According to the invention recited in claim 5, data of the angle of vertical deflection of the reflective plate is transmitted from the rotational optical portion to the body, and the angle of vertical deflection of the reflective plate of the rotational optical portion is controlled based on the data of the angle. The angle of the vertical deflection of the reflective plate is variable while the rotational optical portion horizontally rotates, whereby a distance and an angle can be three-dimensionally measured.

According to the present invention, a three-dimensional position-measuring apparatus has a structure comprising a rotatable measuring portion that turns an optical axis for measuring a distance in any direction, and signals can be transmitted between the measuring portion and the body without contact. Therefore, wear that would be caused by contact of the electrodes does not occur, whereby durability of the electrodes is improved, and part costs and maintenance costs can be minimized.

DETAILED DESCRIPTION OF THE PREFERRED EMBODIMENTS

1. First Embodiment

Outline

Figure 1:
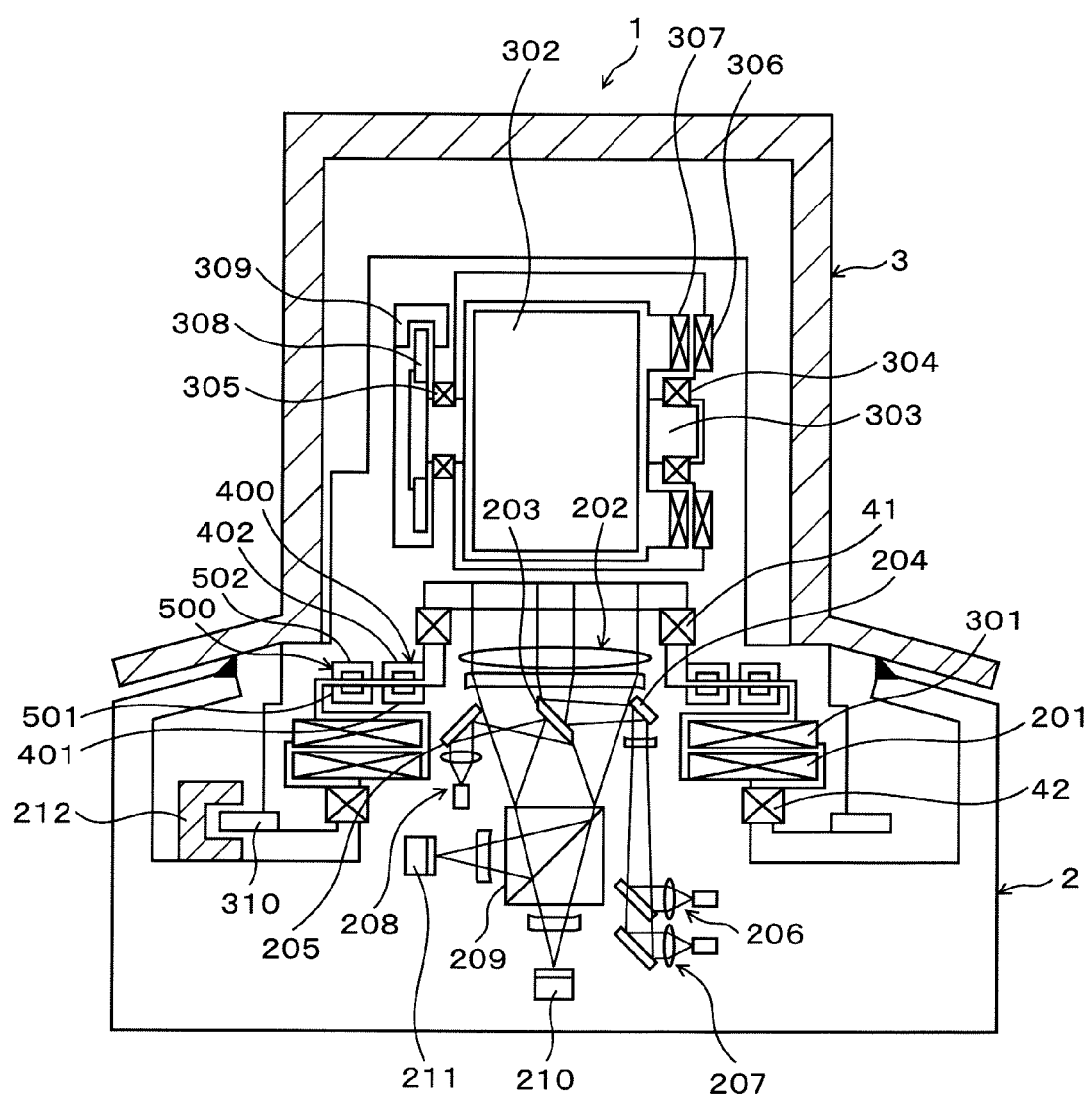
FIG. 1 is a schematic drawing showing a three-dimensional position-measuring apparatus using the present invention.

FIG. 1 is a schematic drawing showing an outline of a three-dimensional position-measuring apparatus using the present invention. FIG. 1 shows a three-dimensional position-measuring apparatus 1 comprising a body 2 and a rotational optical portion 3 which is rotatably mounted on the body 2 via rotational bearings 41 and 42.

The rotational optical portion 3 comprises a rotational reflective mirror 302 in which an angle of vertical deflection is controllable, and it rotates with respect to the body 2. Data signal transmission between the body 2 and the rotational optical portion 3 and electric power supply from the body 2 to the rotational optical portion 3 are controlled via a data transmitting device 400 and an electric power transmitting device 500. These transmitting devices comprise coils at both sides of the body 2 and the rotational optical portion 3, and the coils at both sides have a rotational center as an axis and are slightly separated. Data signals and electric power are transmitted by mutual induction, which is generated between the coils, regardless of the rotation of the rotational optical portion 3.

Rotational Structure

A stator 201 is arranged in the body 2 and comprises a structure in which plural magnetic poles wound with a coil are disposed on the circumference. A rotor 301 is arranged at a portion of the rotational optical structure 3 that faces the stator 201. The rotor 301 has a structure comprising plural permanent magnets on the circumference. When the plural magnetic poles of the stator 201 are switched on and are supplied with electric power by a control circuit (not shown in the figure), power for rotating the rotor 301 with respect to the stator 201 occurs, whereby the rotational optical portion 3 rotates with respect to the body 2. The stator 201 and the rotor 301 form a DD (Direct Drive) motor utilizing a function of a brushless DC motor.

Structure of Body 2

A structure of the body 2 will be described hereinafter. The body 2 comprises a primary lens system 202 that is formed by combining plural lenses so as to yield predetermined optical characteristics. A first secondary reflective mirror 203 is disposed under the primary lens system 202 and has reflective surfaces at both sides. FIG. 1 shows a second secondary reflective mirror 204 which is disposed on the right side of the first secondary reflective mirror 203 and a third secondary reflective mirror 205 which is disposed on the left side of the first secondary reflective mirror 203.

A tracking light emitting portion 206 and a distance-measuring light emitting portion 207 are disposed under the second secondary reflective mirror 204. The tracking light emitting portion 206 emits light (tracking-light) for tracking (searching) a reflective device called a "corner cube". The distance-measuring light emitting portion 207 emits light (distance-measuring light) for measuring a distance, and the light is irradiated on the corner cube. The tracking light emitting portion 206 comprises a half mirror so that the distance-measuring light emitted from the distance-measuring light emitting portion 207 is conducted to the second secondary reflective mirror 204. In this case, the wavelengths of the tracking light and the distance-measuring light are different from each other.

A distance-measuring light receiver 208 for receiving the distance-measuring light is disposed under the third secondary reflective mirror 205. A selective reflective mirror 209 is disposed under the first secondary reflective mirror 203. The selective reflective mirror 209 upwardly reflects the distance-measuring light and reflects the tracking light to the left direction in the figure, and it transmits other light (light having wavelengths except the wavelengths of the tracking light and the distance-measuring light) downwardly. A CCD 210 for taking an image that is reflected on the rotational reflective mirror 302 is disposed under the selective reflective mirror 209, and a CCD 211 for detecting the tracking light is disposed on the left side of the selective reflective mirror 209.

The body 2 comprises an angle-detecting portion 212 of a rotary encoder for detecting a direction (horizontal angle (angle of direction)) that is directed by the rotational optical portion 3. The angle-detecting portion 212 has a sideways U shape and comprises a light-emitting diode on a wall thereof and a phototransistor on the other wall thereof. The phototransistor detects pulse light which passes between the light-emitting diode and the phototransistor, whereby a signal of angular information is output from the angle-detecting portion 212. The pulse light passes through a slit of an angle-read portion 310, which will be described hereinafter. The angle-read portion 310 and the angle-detecting portion 212 form an angle-detecting device for detecting an angle by utilizing the same function as that of a general rotary encoder.

Figure 4:
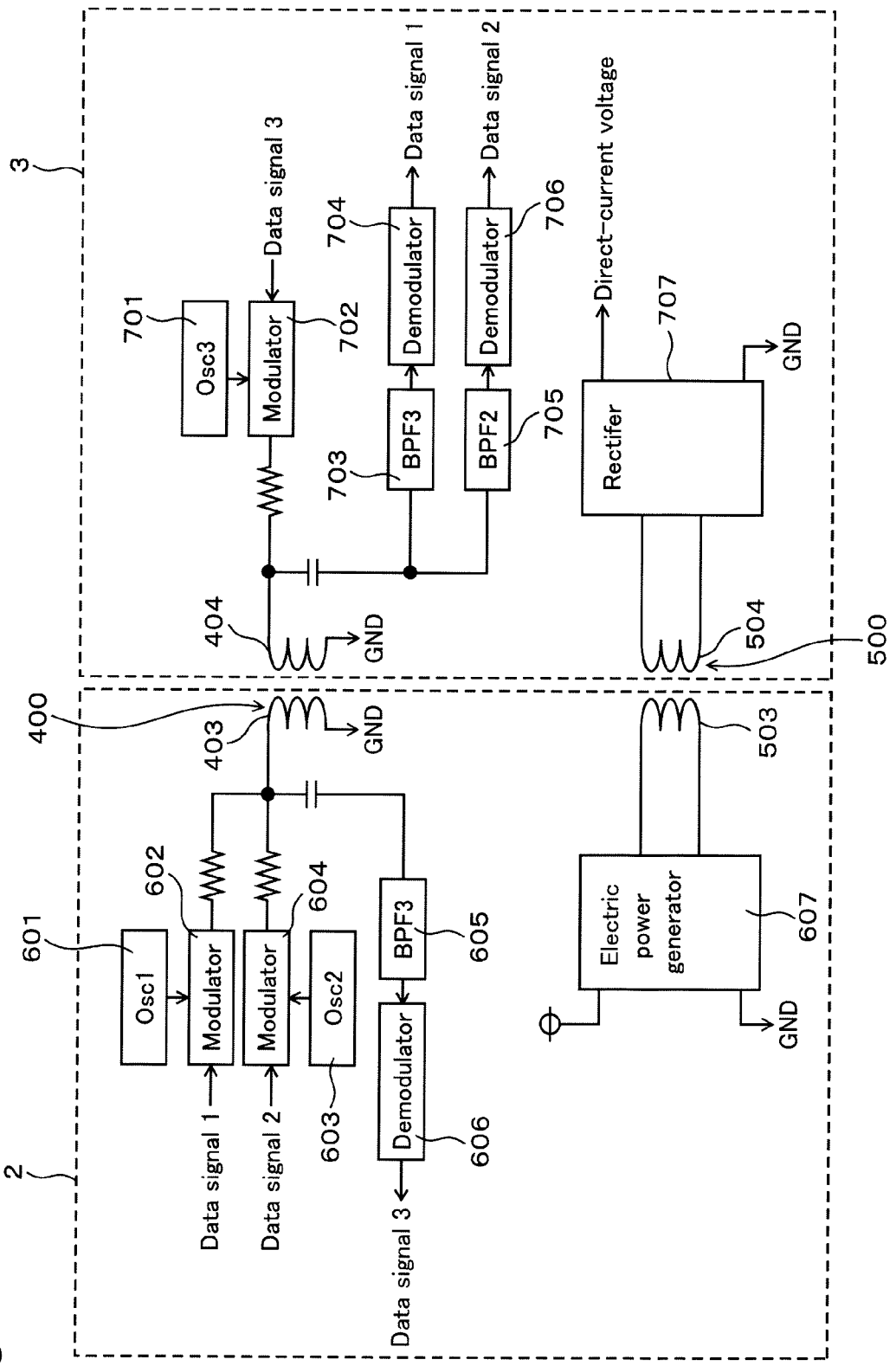
FIG. 4 is a block diagram showing a part of an electric circuit structure of the three-dimensional position-measuring apparatus shown in FIG. 1.

In addition to the above-described portions, the body 2 comprises an electric source (not shown in the figure), a control system (not shown in the figure), and a circuit that is shown in FIG. 4 and is described hereinafter. In this case, the control system comprises a CPU, a memory, and various interface circuits, and it performs movement control and calculation of a distance, which are described hereinafter. The memory of the control system stores various measurement data and image data.

Structure of Rotational Optical Portion 3

A structure of the rotational optical portion 3 will be described hereinafter. The rotational optical portion 3 comprises a rotor 301 at a position opposite to the stator 201 of the body 2. The rotor 301 has plural permanent magnets on the circumference. Moreover, the rotational optical portion 3 comprises a rotational reflective mirror 302. The rotational reflective mirror 302 is mounted in the rotational optical portion 3 by a rotational shaft 303 for controlling an angle of vertical deflection, and the angle of vertical deflection thereof can be changed. The rotational axis 303 for controlling an angle of vertical deflection is supported by a rotational optical portion 3 with rotational bearings 304 and 305. An opening (not shown in the figure) is provided at the front of the rotational reflective mirror 302 so that the rotational reflective mirror 302 emits light to the outside and receives light from the outside. According to this structure, controlling of deflection in a vertical direction can be performed by the rotational reflective mirror 302. The controlling of the deflection in a vertical direction is performed by controlling an optical axis so as to emit the tracking light and the distance-measuring light, which are output from the body 2, in any direction in a vertical plane (that is, the upward direction and the downward direction). It should be noted that the angle of vertical deflection is defined as a rotational angle of the rotational reflective mirror 302 which has the rotational shaft 303 for controlling the angle of vertical deflection as an axis.

A stator 306 is arranged in the rotational optical portion 3 and has a structure in which plural magnetic poles wound with a coil are disposed on the circumference. A rotor 307 is arranged at a portion of the rotational reflective mirror 302 side which faces the stator 306. The rotor 307 has a structure in which plural permanent magnets are disposed on the circumference. The stator 306 and the rotor 307 form a DD (Direct Drive) motor utilizing a function of a brushless DC motor. When the plural magnetic poles of the stator 306 are switched on and are supplied with electric power by a control circuit (not shown in the figure), power for rotating the rotor 307 with respect to the stator 306 occurs. Accordingly, the angle of vertical deflection of the rotational reflective mirror 302 can be controlled.

An end of the rotational axis 303 for controlling the angle of vertical deflection is mounted with an angle-read portion 308 that is formed with a slit in the circumferential direction. The rotational optical portion 3 comprises an angle-detecting portion 309. The angle-detecting portion 309 has a sideways U shape and comprises a light-emitting diode on a wall thereof and a phototransistor on the other wall thereof. When pulse light passes through the slit of the angle-read portion 308 and passes between the light-emitting diode and the phototransistor, the pulse light is detected by the phototransistor, whereby a signal of angular information is output. The angle-read portion 308 and the angle-detecting portion 309 form an angle-detecting device for detecting an angle by utilizing the same function as that of a general rotary encoder. The rotational optical portion 3 comprises a circuit which is shown in FIG. 4 and is described hereinafter.

Structure of Noncontact Transmission System

Figure 2:
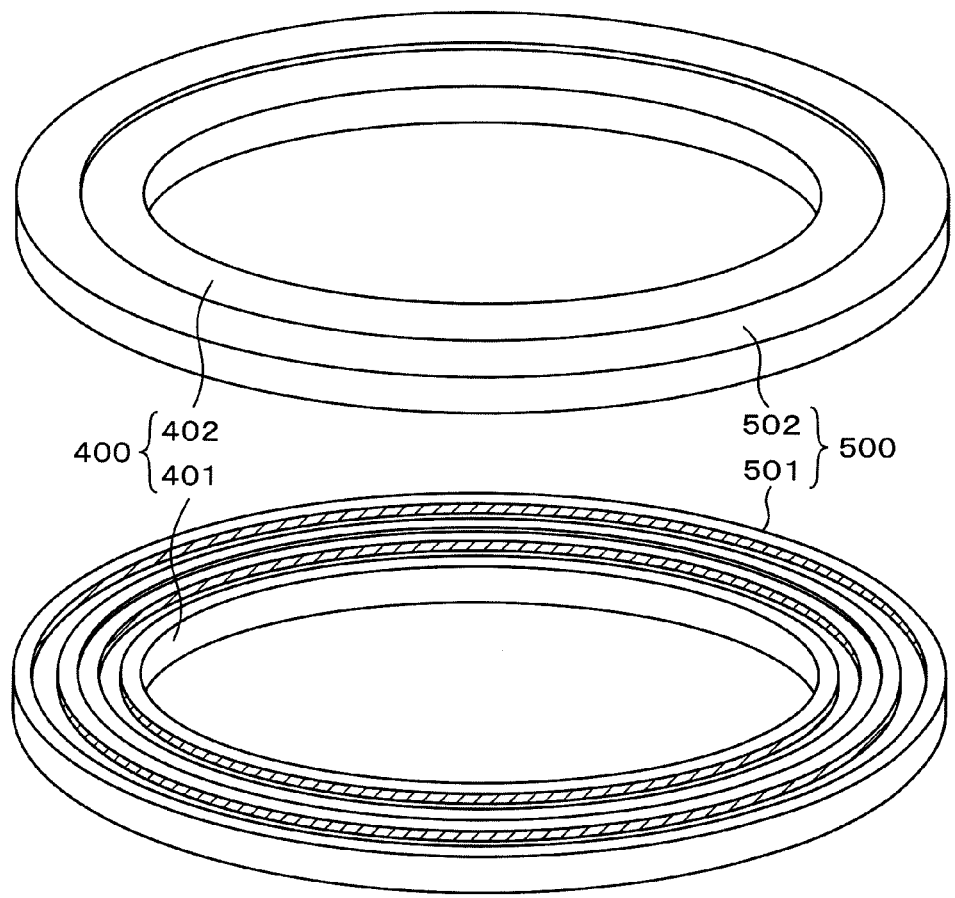
FIG. 2 is a perspective view showing the outer appearance of a data transmitting device and an electric power transmitting device.

A structure for transmitting data and electric power between the body 2 and the rotational optical portion 3 without contact will be described hereinafter. The three-dimensional position-measuring apparatus 1 shown in FIG. 1 comprises a data transmitting device 400 and an electric power transmitting device 500. FIG. 2 is a perspective view showing an outer appearance of the data transmitting device 400 and the electric power transmitting device 500.

The data transmitting device 400 will be described hereinafter. The data transmitting device 400 comprises a first data transmitting and receiving portion 401, which is disposed in the body 2, and a second data transmitting and receiving portion 402 which is disposed in the rotational optical portion 3. Both the first data transmitting and receiving portion 401 and the second data transmitting and receiving portion 402 are made of a magnetic material (ferrite) and have a circular ring shape with a concave cross section. The inside of the concave portion in cross section is disposed with a coil (not shown in FIGS. 1 and 2).

Figure 3:
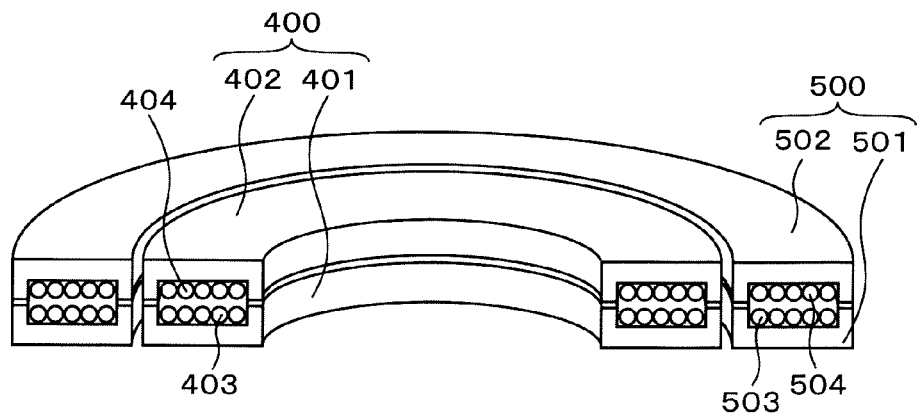
FIG. 3 is a perspective cross section view showing a structure in cross section of a data transmitting device and an electric power transmitting device.

FIG. 3 is a perspective cross sectional view showing outer appearances and structures in cross section of the data transmitting device 400 and the electric power transmitting device 500. As shown in FIG. 3, a coil 403 is held (is inserted) inside of the concave portion in cross section of the first data transmitting and receiving portion 401, and a coil 404 is held inside of the concave portion in cross section of the second data transmitting and receiving portion 402. The first data transmitting and receiving portion 401 and the second data transmitting and receiving portion 402 are positioned so that the open portion of the concave cross section of the first data transmitting and receiving portion 401 and the open portion of the concave cross section of the second data transmitting and receiving portion 402 face each other, and so that a predetermined space (from several tens of microns to several hundreds of microns) is provided therebetween. In this case, the positions of the coil 403 and the coil 404 are adjusted so that the axes thereof coincide with the rotational axis of the rotational optical portion 3.

According to this structure, since the coils 403 and 404 are magnetically coupled, when high frequency electric current is sent in a coil, high frequency electric current having the same frequency as that of the above high frequency electric current is sent in the other coil by mutual induction. Noncontact data transmission can be performed by utilizing this function. While the mutual induction occurs, a closed magnetic path is formed through the inside of the first data transmitting and receiving portion 401 and the second data transmitting and receiving portion 402 that are made of a magnetic material, whereby transmission loss can be decreased.

The electric power transmitting device 500 will be described hereinafter. The electric power transmitting device 500 comprises an electric power transmitting portion 501, which is disposed in the body 2, and an electric power receiving portion 502, which is disposed in the rotational optical portion 3. Both of the electric power transmitting portion 501 and the electric power receiving portion 502 are made of a magnetic material (ferrite) and have a circular ring shape with a concave cross section.

As shown in FIG. 3, a coil 503 is held inside of the concave portion in cross section of the electric power transmitting portion 501, and a coil 504 is held inside of the concave portion in cross section of the electric power receiving portion 502. The electric power transmitting portion 501 and the electric power receiving portion 502 are positioned so that the open portion of the concave cross section of the electric power transmitting portion 501 and the open portion of the concave cross section of the electric power receiving portion 502 face each other, and so that a predetermined space (from several tens of microns to several hundreds of microns) is provided therebetween.

According to this structure, when high frequency electric current is transmitted in a coil, high frequency electric current having the same frequency as that of the above high frequency electric current is transmitted in the other coil due to mutual induction. Noncontact data transmission can be performed by utilizing this function. While the mutual induction occurs, a closed magnetic path is formed through the inside of the electric power transmitting portion 501 and the electric power receiving portion 502 that are made of a magnetic material, whereby transmission loss can be decreased.

Circuit Structure

A circuit structure for transmitting data and electric power between the body 2 and the rotational optical portion 3 without contact will be described hereinafter. FIG. 4 is a block diagram showing a part of an electric circuit structure of the three-dimensional position-measuring apparatus 1 shown in FIG. 1. FIG. 4 shows an example of a circuit structure for transmitting data and electric power without contact.

In the example, two kinds of data signals (in this case, two kinds of control signals) and electric power of an electric source (electric power of an electric source for the rotational optical portion 3) are transmitted from the body 2 to the rotational optical portion 3. In addition, one kind of data signal is transmitted from the rotational optical portion 3 to the body 2.

The data signals transmitted from the body 2 to the rotational optical portion 3 consist of a control signal (data signal 1) for controlling an angle of vertical deflection of the rotational reflective mirror 302 and a control signal (data signal 2) for measuring data of the angle of vertical deflection at an appropriate timing. The data signal transmitted from the rotational optical portion 3 to the body 2 consists of a signal (data signal 3) of the data of the angle of vertical deflection of the rotational reflective mirror 302. In this example, the data signal 2 is a pulse wave pattern for transmitting the timing, and the other data signals are digital data. In addition to the above data, other control data can be transmitted.

A circuit structure of the body 2 for transmitting data will be described. As shown in FIG. 4, the body 2 comprises a carrier oscillator (Osc 1) 601, a modulator 602, a carrier oscillator (Osc 2) 603, a modulator 604, a band-pass filter (BPF3) 605, and a demodulator 606. The carrier oscillator (Osc 1) 601 produces a carrier wave that modulates the data signal 1. The frequency of the carrier wave is set to be approximately 5 MHz, for example. An oscillating circuit using a crystal element or a ceramic element that is publicly known, a PLL oscillating circuit, and the like may be used as the oscillating circuit of the carrier oscillator.

The modulator 602 modulates the amplitude of the data signal 1. An AND gate or various mixer circuits may be used as a circuit of the modulator. The carrier oscillator (Osc2) 603 produces a carrier wave that modulates the data signal 2. The frequency of the carrier wave produced by the carrier oscillator 603 (Osc 2) is selected so as to be different from the frequency of the carrier wave produced by the carrier oscillator 601 (Osc1), which can be separated by a filter. Specifically, the frequency of the carrier wave produced by the carrier oscillator 603 (Osc2) is set to be different form that of the carrier wave produced by the carrier oscillator 601 (Osc1) by from several tens to several hundreds of kHz. The modulator 604 modulates the amplitude of the first signal. In this case, the same circuit as the modulator 602 is used in the modulator 604.

The band-pass filter (BPF3) 605 is a wavelength selective filter that separates the modulated data signal 3 transmitted from the rotational optical portion 3. A ceramic filter or a crystal filter may be used as the band-pass filter 605. The demodulator 606 demodulates a signal selected by the band-pass filter 605 (the modulated data signal 3 transmitted from the rotational optical portion 3) into the former data signal 3. As a circuit of the demodulator 606, a circuit structure by which AM demodulation such as diode detection is performed may be adopted (not shown in the figure).

A circuit structure of the body 2 for transmitting electric power will be described. The body 2 comprises an electric power generator 607. The electric power generator produces alternating electric current of approximately 20 kHz by using a direct current power supply. The electric power generator comprises an oscillator, an H bridge circuit, and a driving circuit therefor.

A circuit structure of the rotational optical 3 for transmitting data will be described. The rotational optical portion 3 comprise a carrier oscillator (Osc3) 701, a modulator 702, a band-pass filter (BPF3) 703, a demodulator 704, a band-pass filter (BPF2) 705, and a demodulator 706.

The carrier oscillator (Osc3) 701 produces a carrier wave for modulating the data signal 3. The frequency of the carrier wave produced by the carrier oscillator (Osc3) 701 is selected to have a frequency of approximately 5 MHz, which is different from the frequencies produced by the carrier oscillator 601 (Osc1) and the carrier oscillator 603 (Osc2) by from several tens to several hundreds of kHz.

The modulator 702 modulate the data signal 3 based on the carrier wave produced by the carrier oscillator (Osc3) 701. The same circuit as that of the modulators 602 and 604 may be used in the modulator 702. The band-pass filter (BPF1) 703 selectively transmits a frequency of the modulated data signal 1 output from the modulator 602. The demodulator 704 demodulates the modulated data signal 1. The band-pass filter (BPF2) 705 selectively transmits a frequency of the modulated data signal 2 output from the modulator 604. The demodulator 706 demodulates the data signal 2 that is modulated by the modulator 604.

A crystal filter or a ceramic filter, which has a filtering property for transmitting a frequency to be selected, may be adopted as band-pass filters 703 and 705. The demodulators 704 and 706 use a reference signal that is different from that of the modulator 606 in modulating, and they have the same circuit structure as that of the modulator 606.

A circuit structure of the rotational optical portion 3 for transmitting electric power will be described. The rotational optical portion 3 comprises a rectifier 707. The rectifier 707 rectifies alternating electric current of approximately 20 kHz output from the electric power generator 607 so as to obtain direct current voltage.

Example of Operation

Example of Operation for Supplying Electric Power of Electric Source

An example of an operation of the three-dimensional position-measuring apparatus 1 shown in FIG. 1 will be described hereinafter. First, an example of operation for supplying electric power of an electric source from the body 2 to the rotational optical portion 3 will be described. When a primary power supply (not shown in the figure) of the three-dimensional position-measuring apparatus 1 shown in FIG. 1 is turned on, the electric power generator 607 shown in FIG. 4 is started and outputs alternating electric current of 20 kHz. The alternating electric current is supplied to the coil 503 (see FIG. 3) and induces alternating electric current, which has the same frequency as that thereof, in the coil 504 due to mutual induction. The alternating electric current induced in the coil 504 is rectified into direct current voltage by the rectifier 707, and the direct current voltage is supplied to the rotational optical portion 3. Electric power is transmitted from the body 2 to the rotational optical portion 3 without contact, whereby the electric power is supplied from the body 2 to the rotational optical portion 3 regardless of the rotation of the rotational optical portion 3.

Example of Operation for Transmitting Data Signal

A data signal 1 for controlling the angle of vertical deflection of the rotational reflective mirror 302 shown in FIG. 1 is modulated by the modulator 602 shown in FIG. 4, and the modulated signal 1 is supplied to the coil 403 (see FIG. 3) via a resistor. The modulated data signal 1 appears in the coil 404 due to mutual induction and is selected by the band-pass filter 703 (see FIG. 4) so as to be transmitted to the demodulator 704. The demodulator 704 demodulates the modulated data signal 1 into the former data signal 1 and outputs the data signal 1 to a control circuit of a motor (not shown in the figure). The control circuit (not shown in the figure) outputs driving electric current to the stator 306 shown in FIG. 1 based on the data signal 1. Thus, the angle of vertical deflection of the rotational reflective mirror 302 is controlled.

The data signal 2 for measuring the angle of vertical deflection at an appropriate timing is modulated by the modulator 604 shown in FIG. 4, and the modulated signal 2 is supplied to a coil 403 (see FIG. 3) via a resistor. The modulated data signal 2 appears in the coil 404 due to mutual induction and is selected by the band-pass filter 705 (see FIG. 4) so as to be transmitted to the demodulator 706. The demodulator 706 demodulates the modulated data signal 2 into the former data signal 2 and outputs the data signal 2 to a circuit for measuring the angle of vertical deflection (not shown in the figure).

The angle of vertical deflection of the rotational reflective mirror 302 shown in FIG. 1 is detected by the angle-detecting portion 309. The detected data (angle data) is transmitted as a data signal 3 to the modulator 702 shown in FIG. 4. The modulator 702 modulates the data signal 3 and supplies the modulated signal 3 to the coil 404 (see FIG. 3) via a resistor. The modulated data signal 3 appears in the coil 403 due to mutual induction and is selected by the band-pass filter 605 so as to be transmitted to the demodulator 606. The modulated data signal 3 is demodulated by the demodulator 606, and the demodulated data signal 3 is transmitted to a control system (not shown in the figure) in the body 2 shown in FIG. 1.

In this example, each data signal has different frequency and is selected by each band-pass filter, whereby each data signal can be transmitted and received at a time.

Specifically, when a structure shown in FIG. 3 is formed by using a coil having a diameter of approximately 10 cm, a transmitting device (a transformer) having a self-resonant frequency of approximately 7 MHz is obtained. In this case, multiple data can be interactively transmitted at a transmission rate of 100 to 200 KBPS (bit/sec) by using a frequency of approximately 5 MHz as a carrier frequency and by using a ceramic filter having a bandwidth of approximately 200 kHz.

Example of Operation for Measuring Three-Dimensional Position

An example of the operation of the overall three-dimensional position-measuring apparatus 1 shown in FIG. 1 will be described. In this case, the following operation is controlled and is performed by a control system (not shown in the figure) contained in the body 2.

When an operation for measuring a three-dimensional position is started, a corner cube provided in the vicinity of an object is scanned. In this case, tracking light is emitted from the tracking-light emitting portion 206, and it is reflected at the second secondary reflective mirror 204 and the first secondary reflective mirror 203, thereby reaching the primary lens system 202. The tracking light transmitted through the primary lens system 202 is output from the body 2 and reaches the rotational optical portion 3, and it is reflected at the rotational reflective mirror 302, whereby it is emitted to the outside of the apparatus.

In this case, control current is sent to the stator 201, and the rotational optical portion 3 rotates with respect to the body 2. Data for controlling the angle of vertical deflection of the rotational reflective mirror 302 is transmitted from the body 2 to the rotational optical portion 3 via the data transmitting device 400, and controlling of a direction in the vertical plane of the rotational reflective mirror 302 (that is, controlling of the deflection so as to turn the tracking light to the upward direction or the downward direction) is thereby performed. These controls are performed by a control system (not shown in the figure) included in the body 2. Moreover, these controls are performed base on data of an horizontal angle of the rotational optical portion 3, which is obtained by the angle-detecting portion 212, and an angle of vertical deflection of the rotational reflective mirror 302, which is obtained by the angle-detecting portion 309.

Light reflected at the corner cube is detected by changing the horizontal angle and the vertical deflection angle of the tracking light during scanning. When the light reflected at the corner cube enters the rotational reflective mirror 302, the light is received by the body 2 via the primary lens system 202. The reflected light of the tracking light received by the body 2 is reflected at the selective reflective mirror 209 to the left direction in the figure, and it is detected by the CCD 211 for detecting the tracking light. An image captured by the CCD 211 for detecting the tracking light is processed by an image processor in the control system (not shown in the figure). Then, in the control system (not shown in the figure), control current to be output to the stators 201 and 306 is adjusted so that the corner cube is centered in the captured image, and the horizontal angle of the rotational optical portion 3 and the angle of vertical deflection of the rotational reflective mirror 302 are thereby finely adjusted.

When the corner cube is centered in the captured image of the CCD 211 for detecting the tracking light, emission of the tracking light is stopped, and distance-measuring light is emitted from the distance-measuring light emitting portion 207. The distance-measuring light is reflected at the second secondary reflective mirror 204 and the first secondary reflective mirror 203, and the distance-measuring light reaches the rotational reflective mirror 302 via the primary lens system 202 and is reflected thereat. The distance-measuring light reflected at the rotational reflective mirror 302 is emitted to the corner cube that was scanned hereinbefore.

The above distance-measuring light is reflected at the corner cube and enters the rotational reflective mirror 302. Then, the distance-measuring light is received by the body 2 from the primary lens system 202, and the distance-measuring light is upwardly reflected at the selective reflective mirror 209 and is reflected at the first secondary reflective mirror 203 to the left direction. The distance-measuring light reflected at the corner cube is downwardly reflected at the third secondary reflective mirror 205 and is received by the distance-measuring light receiver 208.

The distance-measuring light emitting portion 207 repeats emitting of pulse light at a predetermined interval, and a distance of the corner cube is thereby calculated based on the above output from the distance-measuring light receiver 208 and the timing of the emitting of pulse light. The calculation is performed by a control system (not shown in the figure).

The distance of the corner cube is thus measured. Simultaneously, in order to obtain image information of the position in which distance is measured, an image in which the corner cube is centered is captured by the CCD 210 for taking an image. The image data is stored in a memory (not shown in the figure).

Then, the same operation is repeated with respect to the other corner cubes. Thus, distances of plural corner cubes are measured, and three-dimensional position is thereby measured.

In this operation, while the rotational optical portion 3 is appropriately rotated, and the angle of vertical deflection of the rotational reflective mirror 302 is appropriately controlled, noncontact data transmission and noncontact electric power transmission are performed at the data transmitting device 400 and the electric power transmitting device 500. Therefore, a problem such as wear of electrode members caused by sliding does not occur. Accordingly, high durability and high reliability can be obtained. Moreover, maintenance costs and part costs can be reduced.

2. Additional Embodiment

In the structure shown in FIG. 1, electric power may be transmitted by using the data transmitting device 400. In this case, output of a modulated data signal may be amplified, and the rectified output of the modulated data signal may be used. However, since electric power is required to transmit data, this method is inferior to the case of the first embodiment in electric power consumption. On the other hand, as another method for transmitting electric power by using the data transmitting device 400, electric power waves (for example, high frequency wave of 20 kHz) may be overlapped on a data signal and be separated by a diplexer so as to be transmitted to a rectifier.

In the first embodiment, an example, in which light reflected at a corner cube is detected so as to measure a distance of the corner cube, is described. In addition, the present invention may be used for a three-dimensional position measuring apparatus in which light reflected at an object is detected so as to measure a distance without using a corner cube.

The cross section structure of the data transmitting and receiving portion, the electric power transmitting portion, and the electric power receiving portion is not limited to a concave shape, and a shape such as a concave shape, a horseshoe shape, an L shape, a boomerang shape, and a V shape, which has an open portion in a certain direction and can include the coil, may be used.

Figure 5A:
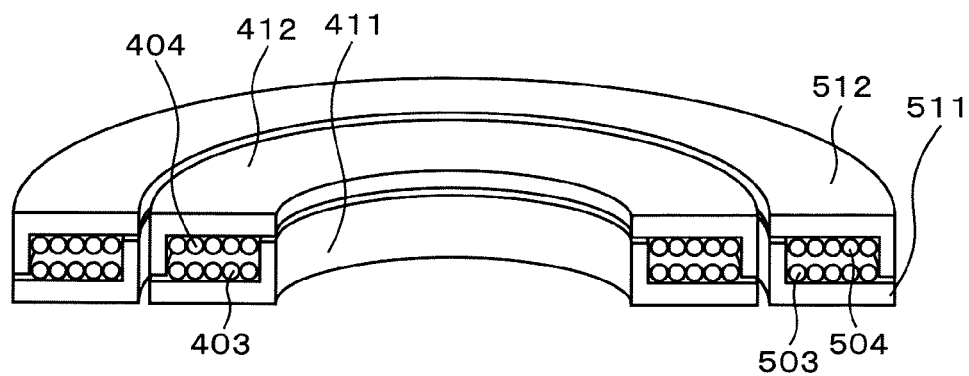
FIGS. 5A and 5B are perspective cross section views showing a structure in cross section of a data transmitting device and an electric power transmitting device.
Figure 5B:
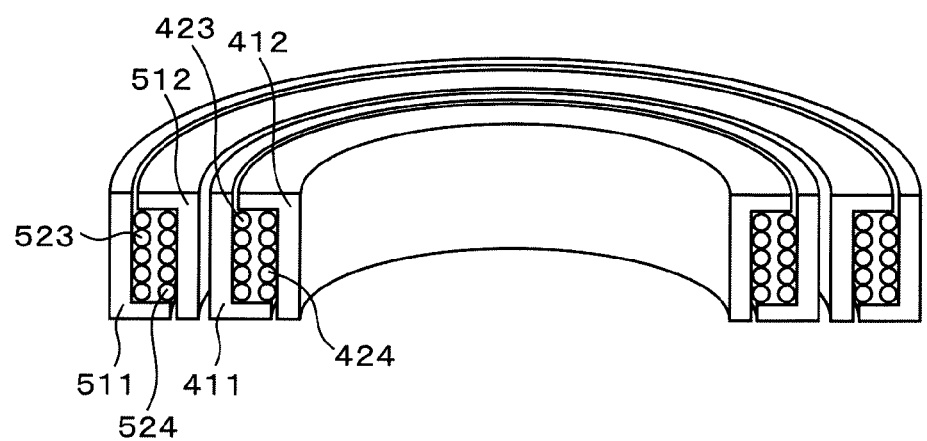

FIGS. 5A and 5B are perspective cross sectional views showing a cross section structure of another embodiment. FIG. 5A shows an example of a first data transmitting and receiving portion 411 and a second data transmitting and receiving portion 412 when a magnetic material having an approximately L-shape in cross section is used. In addition, FIG. 5A shows an electric power transmitting portion 511 and an electric power receiving portion 512 in which the above approximately L-shape is also applied.

FIG. 5B shows an example in which a direction of winding of the coil is different from that in FIG. 5A. FIG. 5B shows a condition in which a first data transmitting and receiving portion 411 has an approximately L-shape in cross section and holds a coil 423 of the body, a second data transmitting and receiving portion 412 also has the approximately L-shape in cross section and holds a coil 424 of the rotational optical portion, and both coils are magnetically coupled. In addition, FIG. 5B shows a condition in which an electric power transmitting portion 511 has an approximately L-shape in cross section and holds a coil 523 of the body, an electric power receiving portion 512 also has the approximately L-shape in cross section and holds a coil 524 of the rotational optical portion, and both coils are magnetically coupled.

The present invention may be used for data transmitting structures in a three-dimensional position-measuring apparatus and be used for three-dimensional position-measuring apparatuses comprising such a data transmitting structure.

The invention claimed is:

1. A three-dimensional position-measuring apparatus comprising:
    a body;
    a rotational optical portion rotatable with respect to the body in a horizontal direction and comprising a reflective plate in which deflection in a vertical direction is controllable;
    a first data transmitting and receiving portion arranged in the body and comprising a first coil which has a rotational axis of the rotational optical portion as an axis; and
    a second data transmitting and receiving portion arranged in the rotational optical portion and comprising a second coil that has the same axis as that of the first coil and magnetically couples with the first coil,
    wherein a data signal is transmitted and received between the rotational optical portion and the body portion without contact by mutual induction of the first coil and the second coil.

2. The three-dimensional position-measuring apparatus according to claim 1, further comprising:
    a first circular portion made of a ring-shaped magnetic material and having a cross section of which a part is open so as to contain a member; and
    a second circular portion made of a ring-shaped magnetic material and having a cross section of which a part is open so as to contain a member,
    wherein the first coil is inserted into the inside of the first circular portion, and the second coil is inserted into the inside of the second circular portion, wherein the first circular portion and the second circular portion are coaxially arranged such that each open portion of the holding shape thereof faces another.

3. The three-dimensional position-measuring apparatus according to claim 1, further comprising:
an electric power supply portion arranged in the body and comprising a third coil that has the rotational axis of the rotational optical portion as an axis; and
an electric power receiving portion arranged in the rotational optical portion and comprising a fourth coil that has the same axis as that of the third coil and magnetically couples with the third coil.

4. The three-dimensional position-measuring apparatus according to claim 1,
wherein plural data signals, each having a frequency that is different from that of the others, are transmitted between the first data transmitting and receiving portion and the second data transmitting and receiving portion.

5. The three-dimensional position-measuring apparatus according to claim 1,
wherein the rotational optical portion comprises a measuring device for measuring an angle of vertical deflection of the reflective plate,
wherein a control data for controlling the angle of vertical deflection is transmitted from the first data transmitting and receiving portion to the second data transmitting and receiving portion, and
wherein an output of the measuring device is transmitted from the second data transmitting and receiving portion to the first data transmitting and receiving portion.

* * * * *